United States Patent
Grape et al.

(10) Patent No.: US 6,177,481 B1
(45) Date of Patent: Jan. 23, 2001

(54) DEFOAMER MIXTURES, A PROCESS FOR THE PRODUCTION THEREOF AND THE USE THEREOF

(75) Inventors: Wolfgang Grape, Köln; Jürgen Krott, Leverkusen; Jan Mazanek, Köln; Karl-Heinz Kaesler, Bergisch Gladbach, all of (DE)

(73) Assignee: Bayer Aktiengesellschaft, Leverkusen (DE)

( * ) Notice: Under 35 U.S.C. 154(b), the term of this patent shall be extended for 0 days.

(21) Appl. No.: 09/397,345

(22) Filed: Sep. 15, 1999

Related U.S. Application Data

(63) Continuation of application No. 08/870,349, filed on Jun. 5, 1997, now abandoned.

(30) Foreign Application Priority Data

Jun. 12, 1996 (DE) .............................. 196 23 409

(51) Int. Cl.⁷ .................................. B01D 19/04
(52) U.S. Cl. .................. 516/124; 516/117; 516/118; 516/119; 516/123
(58) Field of Search .................... 516/117, 118, 516/119, 123, 124

(56) References Cited

U.S. PATENT DOCUMENTS

| | | | |
|---|---|---|---|
| 3,362,780 | 1/1968 | Kuth et al. | 8/582 |
| 3,984,347 | 10/1976 | Keil | 516/118 |
| 4,155,892 | 5/1979 | Emmons et al. | 524/507 |
| 4,395,352 | 7/1983 | Kulkarni et al. | 516/118 |
| 4,481,367 | 11/1984 | Knopf | 560/26 |
| 4,919,843 | 4/1990 | Innertsberger et al. | 516/117 |
| 5,023,309 | 6/1991 | Kruse et al. | 528/49 |
| 5,082,590 | 1/1992 | Araud | 516/121 |
| 5,153,258 | 10/1992 | Nakahara et al. | 524/588 |
| 5,500,475 | 3/1996 | Eicken et al. | 524/591 |
| 5,594,087 | 1/1997 | Konig et al. | 528/44 |

FOREIGN PATENT DOCUMENTS

| | | |
|---|---|---|
| 36 30 319 A1 | 3/1988 | (DE) . |
| 4 237 754 | 1/1994 | (DE) . |
| 43 43 185 C1 | 11/1994 | (DE) . |
| 0 306 007 | 3/1989 | (EP) . |
| 0 516 109 | 12/1992 | (EP) . |
| 0 579 999A2 | 1/1994 | (EP) . |
| 0 666 301 | 8/1995 | (EP) . |
| WO94/14877 | 7/1994 | (WO) . |

OTHER PUBLICATIONS

Translation PTO 98–1099, corresponding to DE 42 37 754 C1 (USPTO Jan. 1998).*

* cited by examiner

*Primary Examiner*—Richard D. Lovering
*Assistant Examiner*—Daniel S. Metzmaier
(74) *Attorney, Agent, or Firm*—Norris McLaughlin & Marcus P.A.

(57) ABSTRACT

The present invention relates to mixtures comprising at least one polysiloxane defoamer, at least one emulsifier, at least one nonionic surfactant, at least one polyurethane thickener and water, to a process for the production thereof and to the use thereof.

4 Claims, No Drawings

DEFOAMER MIXTURES, A PROCESS FOR THE PRODUCTION THEREOF AND THE USE THEREOF

This application is a continuation of application Ser. No. 08/870,349, filed Jun. 05, 1997, now abandoned.

The present invention relates to mixtures comprising at least one polysiloxane defoamer, at least one emulsifier, at least one nonionic surfactant, at least one polyurethane thickener and water, to a process for the production thereof and to the use thereof.

Defoamer emulsions are macroemulsions in which the average particle size of the dispersed particles may very well exceed 10 μm or even 100 μm. The disperse phase consists of the defoamer active substance alone or contains this in a carrier medium, such as, for example, an organic solvent.

It is known to use organopolysiloxanes as defoamer active substances. The term organopolysiloxanes may denote, on the one hand, pure silicone oils (polydimethylsiloxanes) but, on the other, may also include polysiloxane/polyoxyalkylene block copolymers. The oils may contain finely divided solids, which generally further promote the defoaming action. Examples of such finely divided solids are highly disperse, optionally hydrophobised silicas obtained by pyrolysis or precipitation, magnesium or aluminium oxide as well as magnesium stearate.

As a consequence of the relatively large particles in the disperse phase, defoamer emulsions have a tendency to settle and coalesce. It is thus necessary to stabilise the emulsions by adding suitable auxiliary substances (for example protective colloids). This increases the viscosity of the continuous phase, thereby counteracting settling. The protective colloids may also congregate at the disperse phase interface, thereby sterically stabilising it and preventing coalescence.

A list of compounds which may be used as protective colloids is given, for example, in the publication by W. B. Shapiro, "Thickening Oil-in-Water Emulsions" in Cosmetics & Toiletries 97 (1982), pp. 27 et seq.

Examples of such protective colloids are cellulose derivatives, such as methylcellulose, carboxymethylcellulose, hydroxyethylcellulose, hydroxypropylcellulose or hydroxymethylpropylcellulose, as well as synthetic polymers, such as for example polyvinyl alcohol or polyacrylates together with biosynthetic polymers, such as for example xanthan gum.

It is known to use certain linear water-soluble or water-dispersible polyurethanes, such as for example

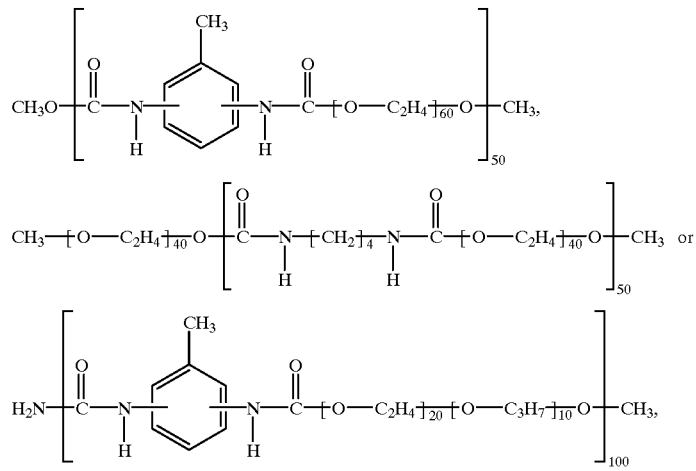

as protective colloids for defoamer emulsions (see e.g. DE-A 42 37 754).

The defoamer emulsions described therein are, however, neither sufficiently stable in storage nor sufficiently effective.

An object of the present invention was thus to provide a mixture which was highly effective with regard to defoaming and also very stable in storage.

It has surprisingly now been found that these characteristics may be improved if associative thickeners, i.e. thickeners comprising molecules having hydrophilic and (purposefully incorporated) hydrophobic groups, based on polyurethane are used in combination with certain nonionic surfactants.

The present invention accordingly provides mixtures comprising
- at least one polysiloxane defoamer A),
- at least one emulsifier B),
- at least one nonionic surfactant C) of the formula R—(AO)$_x$OH wherein
  R is an optionally substituted C$_6$–C$_{14}$ aromatic residue,
  AO is C$_2$–C$_4$ alkylene oxide and
  x is 1 to 300,
- at least one polyurethane thickener having a weight average of 5000 to 60000 D) and
- water E).

In the following the term substituted has the meaning of C$_1$–C$_{12}$-alkyl groups.

The polysiloxane defoamer A) comprises any type of defoamer active substances based on polysiloxane, as are for example described in U.S. Pat. No. 5,082,590, U.S. Pat. No. 3,984,347 as well as the polyether siloxanes described in DE-A 4 343 185 or U.S. Pat. No. 5,153,258. Preferably, however, A) is a silicone oil, such as for example polydimethylsiloxane and/or organically modified siloxanes, such as for example polysiloxan polyether copolymers, optionally in combination with at least one solid. This solid is preferably a hydrophobic solid. The solid may be hydrophobised in advance or in situ using familiar methods or may already be hydrophobic.

The solid is preferably silica, magnesium or aluminium oxide or magnesium stearate, particularly preferably silica.

Both nonionic as well as anionic and cationic emulsifiers may be used as the emulsifier B). Examples of nonionic emulsifiers are alkyl polyglycol ethers, preferably alkyl polyglycol ethers having 2 to 100 ethylene oxide units and alkyl residues with 8 to 20 carbon atoms, alkylaryl polyglycol ethers, preferably alkylaryl polyglycol ethers having 2 to 100 ethylene oxide units and 8 to 20 carbon atoms in the alkyl and aryl residues, ethylene oxide/propylene oxide block copolymers, preferably those having 8 to 100 ethylene oxide units, fatty acid polyglycol esters, preferably $C_6$–$C_{24}$ fatty acid polyglycol esters containing 2 to 100 ethylene oxide units, such as for example polyoxyethylene triglycerides, natural substances and derivatives thereof, such as for example lecithin, lanolin, saponin, cellulose, cellulose alkyl ethers and carboxyalkylcellulose, the alkyl groups of which each have up to 4 carbon atoms, as well as linear organopolysiloxanes containing polar groups, in particular those having alkoxy groups with up to 24 carbon atoms and/or up to 40 ethylene oxide and/or propylene oxide groups.

Examples of anionic emulsifiers are alkyl sulphates, in particular those having a chain length of 8 to 18 carbon atoms, alkyl and alkyl ether sulphates having 8 to 18 carbon atoms in the hydrophobic residue and 1 to 40 ethylene oxide or propylene oxide units, sulphonates, preferably $C_8$–$C_{18}$ alkyl sulphonates, $C_8$–$C_{18}$ alkylaryl sulphonates, taurides, esters and semi-esters of sulphosuccinic acid with monohydric alcohols or alkylphenols having 4 to 15 carbon atoms, wherein these alcohols or alkylphenols may also be ethoxylated with 1 to 40 ethylene oxide units, alkyl and ammonium salts of carboxylic acids having 8 to 20 carbon atoms in the alkyl, aryl, alkaryl or aralkyl residue, as well as phosphoric acid partial esters and the alkali metal and ammonium salts thereof, preferably alkyl and alkaryl phosphates having 8 to 20 carbon atoms in the organic residue, alkyl ether or alkaryl ether phosphates having 8 to 20 carbon atoms in the alkyl or alkaryl residue with 1 to 40 ethylene oxide units.

Examples of cationic emulsifiers are salts of primary, secondary and tertiary fatty amines having 8 to 24 carbon atoms with acetic acid, sulphuric acid, hydrochloric acid and phosphoric acid, quaternary alkyl and alkylbenzene ammonium salts, preferably those with an alkyl group having 6 to 24 carbon atoms, particularly preferably halides, sulphates, phosphates and acetates, alkylpyridinium, alkylimidazolinium and alkyloxazolinium salts, preferably those with an alkyl chain having 1–18, preferably 6–18, especially the halides, sulphates, phosphates and acetates.

In a preferred embodiment of the present invention, the emulsifier is at least one nonionic emulsifier, particularly preferably polyoxyethylene triglycerides and/or polyethoxylated longer-chain alcohols, very particularly preferably polyoxyethylene triglycerides and polyethoxylated longer-chain alcohols "as used herein the term longer chain means from about 12 carbon atoms to about 24 carbon atoms".

For the purposes of the invention, component C) is preferably at least one compound of the formula $$R-[T-(Q')_w-H]_y \qquad (I),$$

in which

R is a linear or branched hydrocarbon residue, preferably an aliphatic, aromatic, araliphatic or alkylaromatic hydrocarbon residue having 6 to 50 carbon atoms, and/or an aromatic or alkylaromatic $C_6$–$C_{40}$ hydrocarbon residue comprising two or more aromatic rings and/or containing inert substituents, such as for example alkyl residues with 1 to 12 carbon atoms, T is oxygen or a residue of the formula

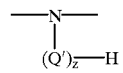

Q' denotes alkylene oxide units, preferably having $C_2$–$C_4$ carbon atoms, particularly preferably ethylene oxide and/or propylene oxide units, providing that at least 70 mol. % of these units are ethylene oxide units, z is a number from 1 to 300, preferably from 2 to 200 and particularly preferably from 5 to 100, y is a number from 1 to 20, preferably from 1 to 10 and particularly preferably from 1 to 4 and w is a number from 1 to 300, preferably from 2 to 200 and particularly preferably from 5 to 100.

The term aromatic stands for phenyl.

Component C) comprises per se known reaction products of alkylene oxides with suitable starter molecules, wherein ethylene oxide, propylene oxide or the isomeric butylene oxides may in particular be considered as the alkylene oxides. Preferably, however, the alkylene oxides comprise ethylene oxide or mixtures of ethylene oxide with propylene oxide having an ethylene oxide content of at least 70 mol. %, wherein the ethylene oxide and propylene oxide units may be randomly distributed or arranged as block copolymers.

Suitable starter molecules for this purpose are preferably mono- or polyfunctional alcohols, phenols or amines, such as for example n-hexanol, n-dodecanol, stearyl alcohol, phenol, isononylphenol or compounds of the formulae

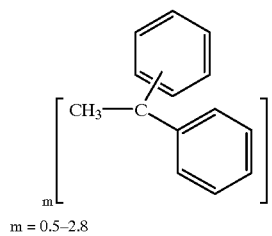

m = 0.5–2.8

-continued

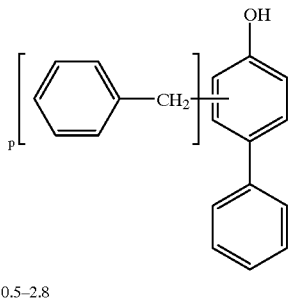

p = 0.5–2.8 wherein statistical mean values are stated for m and p.

Preferred amines are n-hexylamine, hexamethylenediamine, n-dodecylamine or stearylamine.

The nonionic surfactants of the formula I are particularly preferably compounds in which R is

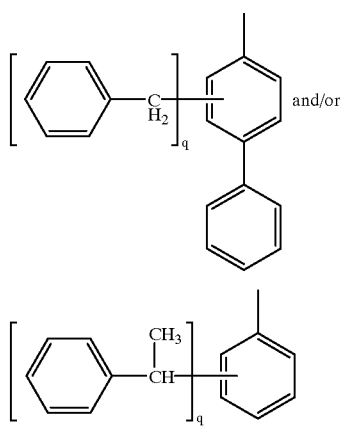

and q is a number between 0.5 and 2.8, preferably between 1.0 (statistical) and 2.5, particularly preferably between 1.5 and 2.5.

Component D) comprises any known polyurethane thickeners.

Polyurethane-based thickeners for aqueous systems are described in numerous publications (c.f. for example U.S. Pat. No. 3,362,780, DE-A 3 630 319, U.S. Pat. No. 4,481, 367, U.S. Pat. No. 5,023,309, EP-A-0 495 373, U.S. Pat. No. 4,079,028, U.S. Pat. No. 4,155,892, U.S. Pat. No. 4,499,233, U.S. Pat. No. 5,023,309 or U.S. Pat. No. 5,594,087).

A common feature of all these prior art thickeners is the simultaneous presence of (i) hydrophilic segments in a quantity of at least 50 wt. %, (ii) hydrophobic segments in a quantity of at most 10 wt. % and (iii) urethane groups. "Hydrophilic segments" should in this connection in particular be taken to mean polyether chains having at least 5 chain links, at least 60 mol. % of the alkylene oxide units of which consist of ethylene oxide units. "Hydrophobic segments" should in this connection in particular be taken to mean hydrocarbon segments having at least 6 carbon atoms.

The component D) stated below of the preparations according to the invention is preferably in accordance with this definition. Preferred polyurethane thickeners are those according to U.S. Pat. No. 4,079,028, tables 2–4 and/or according to U.S. Pat. No. 5,594,087. Particularly preferred polyurethane thickeners are those with hydrophobic segments containing 12 to 18 carbon atoms.

The mixtures according to the invention may additionally contain additives, such as bacteriostatic agents, such as for example products which liberate formaldehyde, such as for example benzyl formal.

Preferred mixtures are those which contain 1 to 75 wt. %, particularly preferably 5 to 60 wt. %, more preferably 10 to 50 wt. % of at least one polysiloxane defoamer A), 0.5 to 15, particularly preferably 1 to 12, more preferably 2 to 10 wt. % of at least one emulsifier B), 0.1 to 10, preferably 0.5 to 6, more preferably 0.5 to 3 wt. % of at least one nonionic surfactant C), 0.1 to 10, particularly preferably 0.5 to 8, more preferably 0.5 to 6 wt. % of at least one polyurethane thickener D) having an average molecular weight of 5000 to 60000, preferably of 7000 to 30000, particularly preferably of 10000 to 20000 and at least 25% of water E).

The present invention also provides a process for the production of the mixture according to the invention, in accordance with which an emulsion is prepared from components A), B) and E) into which an aqueous solution of C) and D) is subsequently added. Preferably used plant includes high speed stirrers, rotor/stator mixers together with colloid mills and the like.

The present invention also provides the use of the mixture according to the invention as a defoamer emulsion.

PRACTICAL EXAMPLES

The following method was used to test the defoaming action of the mixtures according to the invention:

5 g of the defoamer to be tested were swirled with 45 ml of distilled water until the defoamer had dissolved (solution A). After 20 minutes, the surface of the diluted preparation was assessed and classed as good provided that it exhibited no oily or discrete fatty deposits (shown in Emulsion Assessment in the Examples). In order to determine defoaming action, 0.10, 0.25 or 0.5 ml of solution A were placed in a foam beating measuring cylinder. 200 ml of solution B, which was prepared by diluting 25 ml of an alkylsulfonate (Mersolat H 30) to 2 litres, was poured into solution A. The two solutions were then combined using a foam beater set to 50 beats in 35 seconds. After 35 seconds, stirring was ceased and foam height measured. The time which elapsed until the initial volume of 200 ml was reached again was measured with a stop watch. This procedure corresponds to the method known in the art as the Schlachter-Dierkes method.

Example 1

A 55% silicone defoamer emulsion was prepared from the following constituents:

55% of silicone defoamer compound consisting of 92% polydimethylsiloxane of a viscosity of 1000 mPa·s and 8% hydrophobized precipitated silica (Sipernat D 10 from Degussa), 6.5% polyethoxylated tridecyl alcohol, 5% of polyoxyethylene triglyceride, 0.2% of the bacteriostatic agent Preventol D 2 (a benzyl alcohol-monopolyhemiformal from Bayer) and 33.3% of water.

Examples 2 to 8

A 40% defoamer emulsion was produced on the basis of Example 1. The components used were 25.2% of water and 72.8% of the 55% defoamer emulsion from Example 1, 2% of the polyurethane thickener shown below and 2% of a nonionic surfactant (component C) produced from a starter

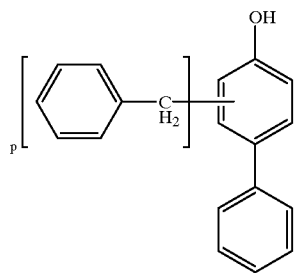

where p = 2 and 14 mol of ethylene oxide.

Polyurethane thickeners 1, 2 and 9 are of the following formulae:

where

R=n-$C_{18}H_{37}$

R'=n-$C_7H_6$ x=59 y=136 and n=1, c.f. Example 79 in U.S. Pat. No. 4,079,028.

Further polyurethane thickeners and the quantities used thereof are shown in Table 1.

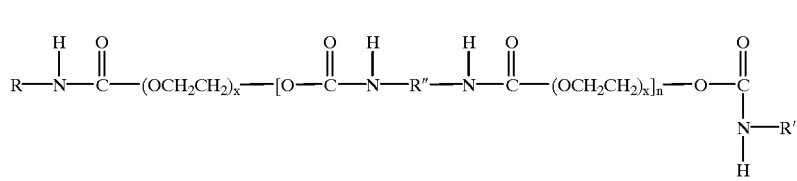

1)

where
  R=n-$C_{18}H_{37}$
  R'=n-$C_{18}H_{37}$
  R''=$C_{13}H_{22}$
  x=136 and
  n=1,
c.f. U.S. Pat. No. 2,079,208, Example 9

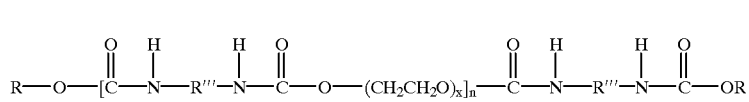

2)

where
  R=n-$C_{18}H_{37}$
  R'''=$C_7H_6$
  x=136 and
  n=2
c.f. U.S. Pat. No. 4,079,028, Example 25

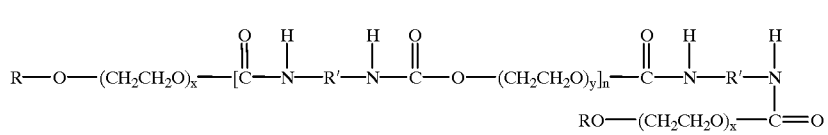

9)

TABLE 1

| Polyurethane thickener | Polyethylene glycol | Diisocyanate | Diol | Literature reference |
|---|---|---|---|---|
| 3 | Stearyl alcohol-started polyethylene oxide polyether (0.2 mol) + polyethylene glycol (0.1 mol) | HDI* (0.275 mol) | 1,12-dodecanediol (0.05 mol) | Example 5 in US-A 5 594 087 |
| 4 | Stearyl alcohol-started polyethylene oxide polyether (0.2 mol) + polyethylene glycol (0.7 mol) | HDI (0.275 mol) | 1,18-octadecanediol (0.025 mol) | Example 8 in US-A 5 594 087 |
| 5 | Stearyl alcohol-started polyethylene oxide polyether (0.2 mol) + polyethylene glycol (0.1 mol) | HDI (0.275 mol) | 1,12-dodecanediol (0.1 mol) | Example 6 in US-A 5 594 087 |
| 6 | Stearyl alcohol-started polyethylene oxide polyether (0.2 mol) + polyethylene glycol (0.1 mol) | HDI (0.275 mol) | 1,6-hexanediol (0.1 mol) | Example 2 in US-A 5 594 087 |

HDI* = Hexamethylene Diisocyanate

Polyurethane thickeners 3, 4, 5 and 6 were produced in the following manner.

748 g (0.2 mol) of a polyethylene oxide polyether based on stearyl alcohol and of an average molecular weight of 3740 were melted together with 748 g (0.1 mol) of polyethylene glycol of a molecular weight of 7480, heated to 120° C. and dehydrated for 3 hours/10 mbar. Once 5.9 g of the diol shown in Table 1 had been added, 46.2 g (0.275 mol) of hexamethylene diisocyanate (HDI) were added in a single portion with stirring at 80° C. After 2 hours at 80° C., the mixture was catalysed with 200 mg of tin dioctoate and the reaction completed for 2 hours at 120° C. After pouring out onto sheet metal and cooling, a slightly yellowish wax was obtained.

Table 1 gives further details and Table 2 shows the results.

TABLE 2

| Example no. | 2 | 3 | 4 | 5 | 6 | 7 | 8 |
|---|---|---|---|---|---|---|---|
| Thickener no. | 1 | 2 | 3 | 4 | 5 | 6 | 7 |
| Comment | stable | stable | stable | stable | stable | stable | stable |
| Emulsion assessment | good | good | good | good | good | good | good |
| 0.50 ml[1] | 50 ml[2]/<1" | 50 ml/<1" | 150 ml/7" | 150 ml/5" | 100 ml/4" | 100 ml/5" | 50 ml/<3" |
| 0.25 ml | 50 ml/<1" | 50 ml/<3" | 200 ml/30" | 200 ml/30" | 150 ml/10" | 150 ml/10" | 50 ml/<3" |
| 0.10 ml | 100 ml/4" | 100 ml/4" | | | | | 100 ml/3" |

If no defoamer was added the foam height was about 600 ml without collapse of the foam.
[1]Amount of defoamer solution according to page 10
[2]It is the foam height after foam beating (e.g. 50 ml foam plus 200 ml starting volume)

Examples 9 to 15

A 30% defoamer emulsion of the following composition was prepared on the basis of Example 1:

54.5% of the 55% defoamer emulsion from Example 1, 3% of the polyurethane thickeners listed in Examples 2 to 10 and 42.4% of water. The following results were obtained (c.f. Table 3).

TABLE 2

| Example no. | 9 | 10 | 11 | 12 | 13 | 14 | 15 |
|---|---|---|---|---|---|---|---|
| Thickener no. | 1 | 2 | 3 | 4 | 5 | 6 | 7 |
| Comment | stable | stable | stable | stable | stable | stable | stable |
| Emulsion assessment | good | good | good | good | good | good | good |
| 0.50 ml[1] | 50 ml[2]/6" | 50 ml/5" | 50 ml/5" | 50 ml/10" | 50 ml/3" | 100 ml/7" | 100 ml/4" |
| 0.25 ml | 100 ml/17" | 100 ml/14" | 150 ml/20" | 200 ml/40" | 150 ml/6" | 200 ml/40" | 150 ml/13" |

[1]Amount of defoamer solution according to page 10
[2]It is the foam height after foam beating (e.g. 50 ml foam plus 200 ml starting volume)

Examples 16 and 17

A 20% defoamer emulsion was produced on the basis of Example 1. Table 4 below shows the composition thereof and the results.

TABLE 4

| | Example no. | |
|---|---|---|
| | 16 % | 17 % |
| Water | 61.6 | 60.6 |
| Thickener no. 9 | 2.0 | 3.0 |
| 55% emulsion, Example 2 | 36.4 | 36.4 |
| Comment | stable | stable |
| Emulsion assessment | good | good |
| 0.50 ml | 50 ml/2" | 50 ml/<3" |
| 0.25 ml | 50 ml/5" | 100 ml/4" |

Example 18 (Comparative Example)

Measurement of defoaming action of a conventional silicone defoamer consisting of 34% of a silicone defoamer compound prepared from 94% silicone oil dimethylsiloxane with a viscosity of 1000 mPa·s and 6% hydrophobised silica, 11% of a polyethoxylated fat alcohol with 20 ethyleneoxide units, 6% of a polyethoxylated nonylphenol with 6 ethyleneoxide units, 0.2% of the bacteriostatic agent Preventol D2 and 48% of demineralised water.

Emulsion assessment, still good. 0.5 ml of solution A and 200 ml of solution B resulted in a foam height of 200 ml and breakdown time of 29 seconds, while 0.25 ml of solution a in 200 ml of solution B resulted in a foam height of 300 ml and a breakdown time of 100 seconds.

What is claimed is:

1. A defoamer emulsion comprising:

A) at least one polysiloxane defoamer,

B) at least one emulsifier which is selected from the group consisting of anionic emulsifiers, cationic emulsifiers and nonionic emulsifiers selected from the group consisting of ethylene oxide/propylene oxide block copolymers, fatty acid polyglycol esters, lecithin, lanolin, saponin, cellulose, cellulose alkyl ethers and carboxyalkylcellulose, the alkyl groups of which have up to 4 carbon atoms, C) at least one nonionic surfactant of the formula:

$$R-[T-(Q')_w-H]_y,$$

in which R is:

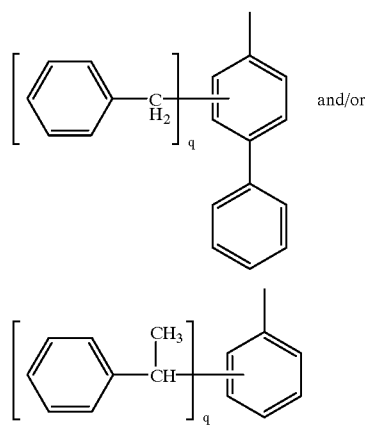 and/or wherein q is a number between 0.5 to 2.8,
T is oxygen or a residue of the formula:

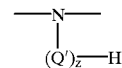

Q' denotes alkylene oxide units, providing that at least 70 mol % of said units are ethylene oxide, z is a number from 1 to 300, y is a number from 1 to 20, and w is a number from 1 to 300, D) at least one polyurethane thickener having a weight average molecular weight of 5,000 to 60,000, and E) water.

2. The defoamer emulsion of claim 1 comprising:

1 to 60% wt. A), 0.5 to 15% wt. B), 0.1 to 10% wt. C), 0.1 to 10% wt. D), and at least 25% wt. E).

3. A process for the production of a defoamer emulsion according to claim 1 which comprises preparing an emulsion from components A), B), and E), and mixing said emulsions with an aqueous solution of C) and D).

4. A method for inhibiting the formation of foam in an aqueous composition, reducing the amount of foam that is formed or increasing the rate at which said foam, once formed, collapses which comprises adding to said aqueous composition a defoamer emulsion of claim 1.

* * * * *